April 12, 1949.    C. M. GILBERT    2,466,984
MOTOR CONTROL CIRCUIT
Filed Sept. 9, 1947

Inventor
CLARKE M. GILBERT
Attorney

Patented Apr. 12, 1949

2,466,984

UNITED STATES PATENT OFFICE 2,466,984

MOTOR CONTROL CIRCUIT

Clarke M. Gilbert, Chappaqua, N. Y., assignor to General Precision Laboratory Incorporated, a corporation of New York Application September 9, 1947, Serial No. 773,062

10 Claims. (Cl. 318—345)

This invention relates to a motor control circuit in which a small signal controls the speed and direction of rotation of a motor. More particularly the present invention relates to a motor control circuit in which a direct current series field motor is controlled in speed and direction of rotation by an alternating current signal and additionally receives its power from an alternating current source.

Heretofore, direct current series field motors have not been well adapted for servo control purposes because of the difficulty in providing a simple circuit arrangement in which the direction of current flowing through a single field coil could be reversed by a change in sense or phase of a control or signal voltage.

Where the use of such a motor has been attempted in the past, comparatively complicated circuits have been necessary involving the use of numerous amplifier stages, mechanical switching circuits and the like.

In accordance with this invention, however, there has been devised a very simple circuit for obtaining reversal of direction of current flow in the single field coil thereby to control the speed and direction of the motor. Additionally the invention incorporates means so that the entire circuit including the motor may be operated from alternating current mains without necessitating the addition of rectifying or other current conversion equipment.

Simplicity of circuit design and operation is achieved by the use of but two discharge tubes which are caused to perform the double function of acting as the rectifiers which convert the alternating current supply to direct current for energizing the motor and at the same time as the control mechanism which reverses the direction of rotation of the motor in response to an impressed signal.

This advantageous result is accomplished by a new and novel circuit in which a pair of discharge devices are connected so as to operate as a full wave rectifier for converting the alternating current of the supply source to the direct current necessary as the energizing means for the motor and at the same time operate as differential amplifying means to produce a field current such that the resultant flux induced in the field coil may be reversed in direction depending on the phase of the impressed control signal.

The exact nature of the invention will be more clearly understood from the following detailed description taken together with the attached drawings, in which.

In the two figures corresponding reference numerals have been used to denote corresponding elements, thereby facilitating comparison of the circuits depicted in these figures.

Figure 1:
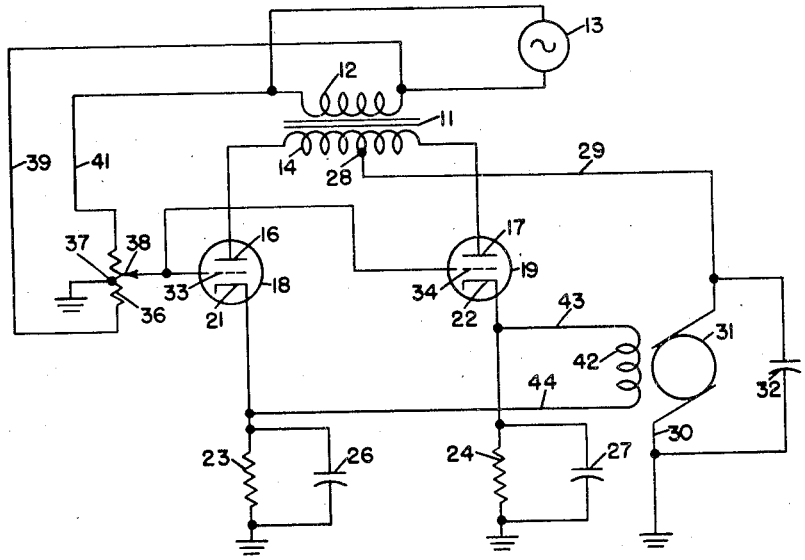
Figure 1 is a schematic diagram of one circuit of the invention.

Referring now to Fig. 1 a pair of discharge tubes 18 and 19 have their anodes 16 and 17 connected to the opposite ends of the secondary 14 of transformer 11, the primary 12 of which is energized by a source of alternating current indicated diagrammatically at 13. Cathodes 21 and 22 of tubes 18 and 19 are each connected to ground through resistors 23 and 24, each of which is bypassed by condensers 26 and 27. The anode circuits of each of the tubes 18 and 19 are completed by a common circuit consisting of the conductor 29 connected to a center tap 28 on the secondary 14, the armature 31, conductor 30 and ground, the armature 31 being shunted by condenser 32.

Tubes 18 and 19 thus constitute a full wave rectifier circuit for the armature 31 converting the alternating current potential existing across secondary 14 to a pulsating unidirectional current which is filtered and smoothed to a direct current by the filtering action of the armature 31 and shunt condenser 32.

The grids 33 and 34 of tubes 18 and 19 are connected together and to a source of alternating current control signal which has here been indicated for purposes of simplicity as a potentiometer 36 grounded at its mid-point 37 and having a movable contact 38 to which the grids 33 and 34 are connected. Alternating current is supplied to the potentiometer by leads 39 and 41 connected to the alternating current source 13.

It is to be understood of course, that the alternating current control signal may be derived from any of the usual sources and by any of the usual means employed in servo control systems, the particular source depicted in the drawings being by way of illustration only and is not to be considered as limited thereto.

Direct current bias is obtained for tubes 18 and 19 by the potential drop in resistors 23 and 24 respectively connected in the cathode circuits of these tubes and bypassed by condensers 26 and 27. The upper, or cathode ends, of these resistors are connected to opposite ends of the field coil 42 through leads 43 and 44 so that the potential impressed across the field coil 42, if any, is the relative difference in potential of the cathodes 21 and 22.

The operation of the circuit disclosed in Fig. 1 is as follows:

Assume first that no control signal is impressed on the grids 33 and 34. That is, that the movable contact 38 has been adjusted at the grounded mid-point 37. The anodes 16 and 17 of tubes 18 and 19 by reason of their connection to opposite ends of the secondary 14 of transformer 11 are alternately made positive on successive half cycles of the alternating supply source and plate current is caused to flow alternately in each of tubes 18 and 19. Since the plate current of each tube includes the armature 31 a full wave rectified current is produced therein by the alternate operation of tubes 18 and 19.

The plate current flowing through tube 18 produces a potential drop in resistor 23 connected in the cathode circuit thereof and similarly plate current flowing through tube 19 produces a potential drop in resistor 24. Under the assumption that no control signal is impressed on the grids 33 and 34, the plate currents in tubes 18 and 19 are equal producing equal potential drops in resistors 23 and 24 and hence cathodes 21 and 22 are at equal potentials above ground. No potential difference, therefore, is impressed across field coil 42 by the connections 43 and 44, no current flows therethrough and the armature 31 does not rotate.

Assume now a condition where an alternating current signal is applied to the grids of the tubes 18 and 19, for example, a condition as represented by the diagram of Fig. 1 where the movable contact 38 is somewhat above the mid-point 37 of potentiometer 36. Under these circumstances the grids 33 and 34 will have impressed thereon an alternating current potential of the same frequency as that of the supply source 13 and the signal applied to the grid of one tube will be in phase with its plate potential while that applied to the grid of the other tube will be out of phase with its plate potential. For example, in the circuit as depicted in Fig. 1, when movable contact 38 is positive with respect to mid-point 37 and hence both grids 33 and 34 are driven in a positive direction, anode 17 is positive while anode 16 is negative, there being a phase inversion from primary 12 to secondary 14 of transformer 11. On the other hand when at the next half cycle anode 16 becomes positive so that tube 18 may draw current the grids are driven in a negative direction. The net result is that the plate current through tube 19 increases while that through tube 18 decreases. There is then an increased potential drop in resistor 24 in the cathode circuit of tube 19 and a decreased potential drop in resistor 23 in the cathode circuit of tube 18. Cathode 22, therefore, assumes a higher potential than cathode 21 and since a difference of potential exists across the field coil 42 current flows therein resulting in rotation of armature 31 in a sense dependent on the direction of current flow in the field coil.

It will be apparent from the above that when the phase of the control signal is reversed by movement of the contact 38 to a point below the mid-point 37, a reversal of the above action occurs in which the plate current through tube 18 increases while that through tube 19 decreases causing the potential impressed across field coil 42 to be reversed and hence the flow of current therein and the direction of rotation of armature 31 to be reversed.

Figure 2:
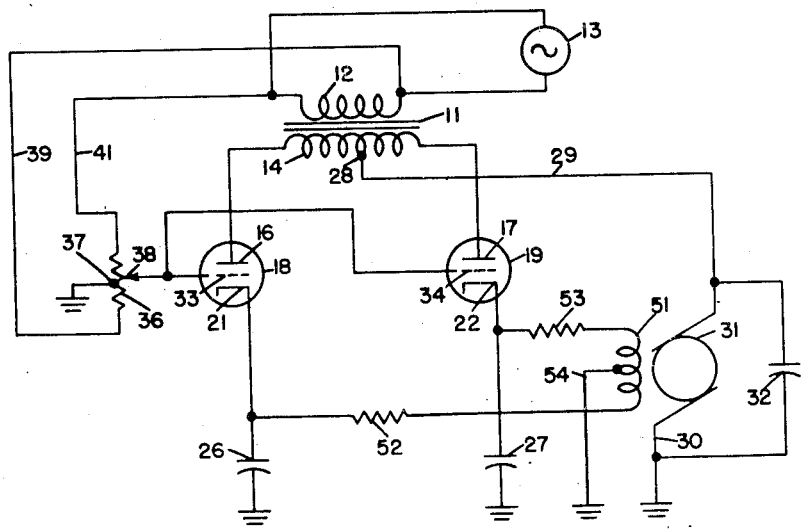
Figure 2 is a modification of the circuit of Fig. 1.

The circuit of Fig. 2 is similar to that of Fig. 1 except cathode 21 is connected to one end of field coil 51 through self-biasing resistor 52 and cathode 22 is connected to the other end of field coil 51 through self-biasing resistor 53 and the field coil 53 is grounded at its mid-point by conductor 54.

In this circuit the plate current of tube 19 flows through the upper half of field coil 51 while that of tube 18 flows through the lower half. As long as no alternating current signal is impressed on these tubes the currents through the two halves of the field coil are equal and opposite and there is no resultant flux produced which would cause the armature 31 to revolve.

When, however, a signal is applied to grids 33 and 34 which results in unequal plate currents in the tubes in the manner heretofore described, the currents in the two halves of the field coil become unequal and there is a resultant flux causing the armature to revolve in one direction or the other depending on the direction of the flux.

There is thus provided by the present invention a control circuit in which a single pair of tubes both act as a rectifier circuit for supplying direct current to a motor armature and as amplifying means for controlling the direction and speed of the motor in accordance with the phase and amplitude of a control signal.

What is claimed is:

1. A motor control circuit comprising a pair of tubes, each having at least anode, cathode and grid electrodes, an alternating current supply source connected to energize said tubes in phase opposition, a motor having a single field coil, means connecting the motor armature in the anode circuit of each of said tubes for energizing said armature by the rectified current flowing in said anode circuits, a circuit simultaneously supplying an alternating current control signal to the grid electrodes of each of said tubes and circuit connections from said cathodes to opposite ends of said field coil.

2. A motor control circuit according to claim 1 in which self-biasing resistors are connected in the cathode circuits of each of said tubes between the opposite ends of said field coil and said motor armature.

3. A motor control circuit according to claim 1 in which self-biasing resistors are connected in the circuit connecting said cathodes to opposite ends of said field coil and the midpoint of said field coil is connected to said motor armature.

4. A motor control circuit comprising a source of alternating current, a full wave rectifier circuit connected to said source for converting said alternating current to a unidirectional current, said full wave rectifier circuit including a pair of tubes each having at least an anode, cathode and control grid, a motor having an armature and a single field coil, a circuit for energizing said armature by said unidirectional current, a first electrical connection between one of said cathodes and one end of said field coil, a second electrical connection between the other of said cathodes and the opposite end of said field coil, and a circuit for simultaneously supplying an alternating control signal to each of said control grids.

5. A motor control circuit according to claim 4 in which each of said first and second electrical connections are connected to said motor armature through a resistor.

6. A motor control circuit according to claim 4 in which each of said first and second electrical connections includes a series resistor and the midpoint of said field coil is connected to said motor armature.

7. A motor control circuit comprising an alternating current supply source, a pair of tubes each having at least an anode, cathode and control grid, a circuit energizing said anodes by said supply source in substantial phase opposition, a motor having a field coil and an armature, a circuit connecting the opposite ends of said field coil to the respective cathodes of said tubes, an alternating current signal circuit simultaneously supplying the control grids of each of said tubes with an alternating current potential of the same amplitude and phase and a circuit for supplying said motor armature with a unidirectional current.

8. A motor control circuit comprising, an alternating current supply source, a pair of tubes each having at least an anode, cathode and control grid, a circuit energizing said anodes by said alternating current source in substantial phase opposition, a motor having a field coil and an armature, a circuit connecting the opposite ends of said field coil to the respective cathodes of said tubes, an alternating current signal circuit simultaneously supplying the control grids of each of said tubes with an alternating current potential of the same amplitude and phase, and a circuit including said motor armature in common with the cathode-anode circuits of each of said tubes.

9. A motor control circuit according to claim 8 in which self-biasing resistors are connected in the cathode circuits of each of said tubes between their junctures with the opposite ends of the field coil and the common cathode-anode circuit.

10. A motor control circuit according to claim 8 in which self-biasing resistors are connected between each of said cathodes and the respective ends of said field coil and the midpoint of said field coil is connected to the common cathode-anode circuit.

CLARKE M. GILBERT.

REFERENCES CITED

The following references are of record in the file of this patent:

UNITED STATES PATENTS

| Number | Name | Date |
| --- | --- | --- |
| 1,655,036 | Alexanderson et al. | Jan. 3, 1928 |
| 1,936,407 | Palmer | Nov. 21, 1933 |
| 2,150,265 | Conover | Mar. 14, 1939 |

FOREIGN PATENTS

| Number | Country | Date |
| --- | --- | --- |
| 750,213 | France | May 22, 1933 |